United States Patent Office 3,422,158
Patented Jan. 14, 1969

---

3,422,158
HALOGENATED SPIRO COMPOUNDS
David Knutson, Buffalo, N.Y., assignor to Hooker Chemical Corporation, Niagara Falls, N.Y., a corporation of New York
No Drawing. Continuation-in-part of application Ser. No. 310,144, Sept. 19, 1963. This application May 16, 1966, Ser. No. 550,183
U.S. Cl. 260—648                                    4 Claims
Int. Cl. A01m 9/20; A01m 9/36

This is a continuation-in-part of S.N. 310,144, filed Sept. 19, 1963, now issued as U.S. 3,251,830.

This invention relates to novel reaction products of tetrahalodiazocyclopentadiene and ethylenically unsaturated hydrocarbons and to the method of preparing these compounds.

In accordance with the invention there is provided a new composition of matter of the formula

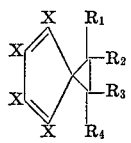

wherein X is halogen and $R_1$, $R_2$, $R_3$ and $R_4$ are selected from the group consisting of hydrogen, substituted and non-substituted hydrocarbyl and conjoined $R_2$ and $R_3$ hydrocarbyl. The halogens may be the same or different. Of the halogens, chlorine is the most preferred, although bromine, iodine and fluorine are also useful radicals and they may be used.

In the preferred method, compounds of the formula

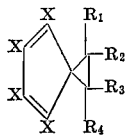

are produced by reacting tetrahalodiazocyclopentadiene

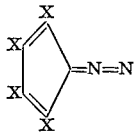

with a compound of the formula $R_1R_2C=CR_3R_4$ at a temperature of about zero to 300 degrees centigrade, wherein X is halogen and the R's are as previously defined. More preferably, the reaction temperature is in the range of 50 to 100 degrees centigrade. Tetrahalodiazocyclopentadiene is prepared as described in my copending application S.N. 310,144, now U.S. Patent No. 3,251,830. In general, tetrahalodiazocyclopentadiene is produced by oxidizing a corresponding tetrahalocyclopentadienone hydrazone

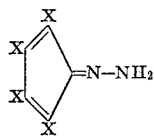

with a suitable oxidizing agent such as lead tetraacetate, or iodine with a suitable base, which may be an alkyl amine in which the alkyl group is of 1 to 6 carbon atoms, such as a trialkyl amine. Additionally, various other suitable oxidizing agents may also be used including silver oxide, mercuric oxide, and the like.

The compounds of the present invention are prepared by reacting tetrahalodiazocyclopentadiene with a compound having a reactive ethylenically unsaturated double bond. The compounds reacted with the tetrahalodiazocyclopentadiene include olefins of 2 to about 26 carbon atoms or more and more preferably 2 to 20 carbon atoms, cyclic alkylenes of 3 to about 10 carbon atoms and more preferably 3 to about 6 carbon atoms, arylalkylenes of 8 to about 26 carbon atoms where the aryl is preferably mononuclear, and the like. Therefore, the compounds being reacted include olefins such as ethylene, propylene, butylene, hexene, heptene, octene, dodecene, halooctene, halohexene, including olefins such as oleyl, linoleyl, and the like, cyclic compounds such as cyclohexene, cyclopentadiene, cyclopentene, cyclobutylene, halocyclopentene, halocyclopentadiene, arylalkylenes such as phenylpentene, phenyloctene, phenylpropylene, styrene, chlorophenylpentene, chlorophenylpropylene, and the like. As will be readily recognized by those skilled in the art, various noninterfering substituents can be attached to the olefin being reacted or the phenyl substituents thereof, particularly halogen substituents such as chlorine, bromine, iodine and fluorine.

The term "hydrocarbyl" is used in the present disclosure to mean substituted and non-substituted alkyl, alkylene, aryl, arylalkyl, arylalkylene, cyclic alkyl, cyclic alkylene, and the like, of 1 to about 26 carbon atoms wherein the substituents, if any, are preferably halogen. The hydrocarbyl corresponds to the radical on both sides of the double bond of the olefin reacted with the diazo compound.

In the reactions of the present invention, numerous novel compounds are prepared, which compounds are particularly valuable as insecticides and herbicides. Depending on the particular olefin reacted with the tetrahalodiazocyclopentadiene, various compounds are formed. When an olefin such as propylene is reacted with tetrachlorodiazocyclopentadiene, the following compound is formed:

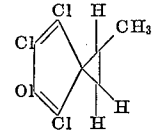

When a cyclic compound such as cyclohexene is reacted with tetrachlorodiazocyclopentadiene, the following compound is formed:

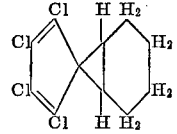

When tetrachlorodiazocyclopentadiene is reacted with bicycloheptadiene, the following compound is formed:

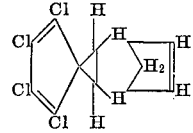

When tetrachlorodiazocyclopentadiene is reacted with styrene, the following compound is formed:

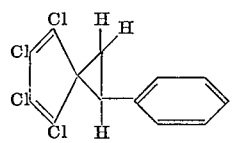

The compounds of the present invention are preferably reacted on a mole to mole basis. Thus, wherein more than one position of unsaturation exists in a given compound, only one point of unsaturation is considered to react with the diazo group. To increase the rate of reaction, it is preferred to use an excess of the more available reactant which is usually the olefin. Reaction times range from about one hour to about 100 hours depending on the reaction temperature and olefin. In most instances, the reaction times are about 12 to 48 hours.

The reaction may be carried out in the presence of a solvent inert to the reactants under the reaction conditions. When one of the reactants is a solvent such as cyclohexene, an excess of the solvent reactant can be utilized, if desired, in place of a non-reactive solvent. Suitable solvents include dimethoxy ethane, toluene, benzene, xylene, diethylether, chlorinated alkanes such as carbon tetrachloride, perchlorethylene, and the like.

Although the reaction is normally conveniently carried out at atmospheric pressure, subatmospheric and superatmospheric pressures can also be used.

Another aspect of the present invention is the production of diazo phosphorus compounds of the formula

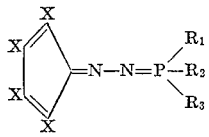

wherein X is halogen and $R_1$, $R_2$ and $R_3$ are hydrogen, alkyl, arylalkyl or aryl. These compounds are made by reacting tetrahalodiazocyclopentadiene with a phosphine such as mono-, di- and triphenyl phosphines, mono-, di- and trialkyl phosphines of 1 to 26 carbon atoms and the like.

These diazo phosphorus compounds are particularly useful as pesticides. The following examples illustrate certain preferred embodiments of the present invention. Unless otherwise indicated, all parts and percentages used herein are by weight and all temperatures in the examples and claims are in degrees centigrade.

Example 1.—Preparation of tetrahchlorodiazocyclopentadiene (starting material)

Tetrachlorocyclopentadieneone hydrazone (4.3 parts) and triethylamine (7.3 parts) were dissolved in 248 parts of ether. A solution of iodine (9.4 parts) in 71 parts of ether was added dropwise with stirring. After standing fifteeen minutes at room temperature the mixture was cooled in an ice bath and filtered. The filtrate was poured into 200 parts of water, acidified with HCl and treated with sodium bisulfite to remove excess oxidizing agent. The ether layer was separated, washed with water and dried over magnesium sulfate. Evaporation of the ether yielded 3.0 parts (70 percent) of yellow crystals. Recrystallization from aqueous ethanol gave 2.1 parts of yellow needles, melting at 110 degrees centigrade. The infrared spectrum (Nujol mull) indicated the absence of NH bands and exhibited bands at 4.6, 4.74, 6.55, 6.8, 7.2, 7.86, 9.28, 12.92 and 13.6$\mu$. The ultraviolet spectrum had a $\lambda$ maximum of 304 and 312 m$\mu$ (both $\epsilon$ (extinction coefficient)=21,500).

*Analysis.*—Calculated for $C_5Cl_4N_2$: Cl, 61.69 percent; N, 12.19 percent. Found: Cl, 61.9 percent; N, 11.74 percent.

This analysis determined that tetrachlorodiazocyclopentadiene was the product made.

Instead of the tetrachlorocylopentadienone hydrazone, when other halogen substituents are present on the hydrazone, such as tetrabromo-, tetraiodo- and mixed halogens, e.g., dichlorodibromocyclopentadienone hydrazones, the corresponding tetrahalodiazocyclopentadienes are made. Instead of triethylamine, other organic bases, such as trimethylamine, tripropylamine and methyl diethylamine may be substituted. Instead of the iodine-trialkylamine oxidizer, other suitable oxidizing agents, e.g., lead tetraacetate, result in production of the desired tetrachlorodiazocyclopentadienes.

Example 2

Tetrachlorodiazocyclopentadiene (2.0 parts) and cyclohexene (32 parts) were heated at a reflux temperature of about 83 degrees centigrade for 17 hours. Removal of excess cyclohexene left 2.94 parts of a dark brown residue. Chromatography on 60 parts of alumina led to the recovery of 1.42 parts of tetrachlorodiazocyclopentadiene and the isolation of 0.56 part of:

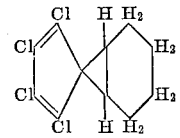

After recrystallization from aqueous ethanol, the

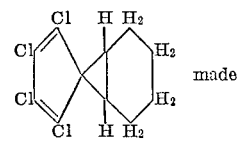 made had a melting point of 104.5–106.5 degrees centigrade. The ultraviolet spectrum had a $\lambda$ maximum of 234 m$\mu$ ($\epsilon$=6,700), 264 m$\mu$ ($\epsilon$=4,200), 288 m$\mu$ ($\epsilon$=3,700), and $\gamma$ 6.35$\mu$.

*Analysis.*—Calculated for $C_{11}H_{10}Cl_4$: C, 46.52 percent; H, 3.55 percent; Cl, 49.94 percent. Found: C, 46.39 percent; H, 3.78 percent; Cl, 49.35 percent.

This product was found to be insecticidal when sprayed on houseflies in solvent solutions.

Example 3

Tetrachlorodiazocyclopentadiene (11.5 parts), bicycloheptadiene (10 parts) and dimethoxyethane (86 parts) were refluxed together at a temperature of about 84 degrees centigrade for 18 hours. After removal of the solvent the residue (15 parts) was chromatographed on 300 parts of alumina to yield 8.6 parts (58.5 percent) of

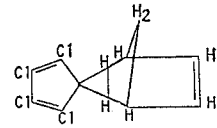

After sublimation the

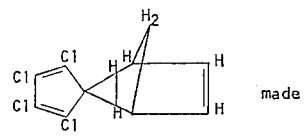 made had a melting point of 58–59 degrees centigrade.

*Analysis.*—Calculated for $C_{12}H_8Cl_4$: C, 49.00 percent; H, 2.76 percent; Cl, 48.24 percent. Found: C, 49.02 percent; H, 2.95 percent; Cl, 48.19 percent.

This material was found to result in 100 percent kill of houseflies in a 24 hour period when sprayed in a one percent concentration on the flies.

Example 4

Tetrachlorodiazocyclopentadiene (2.0 parts) was reacted with 18 parts of styrene in the presence of 86 parts of dimethoxyethane at a reflux temperature of about 84 degrees centigrade for about 48 hours. Removal of the solvent yielded:

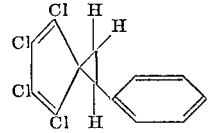

In a like manner other olefinic materials such as ethylene, chlorooctene, phenylpentene, chlorophenylpentene, hexachlorocyclopentadiene, cyclobutylene, and the like, are reacted to produce corresponding novel compounds of the present invention.

Example 5

Tetrachlorodiazocyclopentadiene (46 parts), triphenyl phosphine (52 parts) and toluene (4300 parts) were heated one hour at 88 degrees centigrade. Removal of the solvent yielded 93 parts (95 percent) of

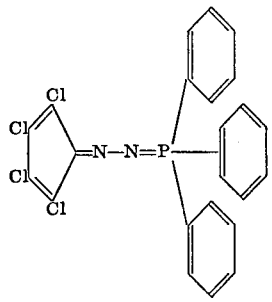

The

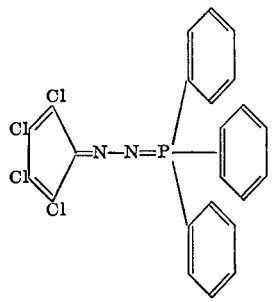

made made separated from ethanol as deep red needles of melting point of 142–143 degrees centigrade (decomposes). The ultraviolet spectrum had a λ maximum of 382 m$\mu$ ($\epsilon$=31,300) γ 6.65, 6.77, 6.93$\mu$.

*Analysis.*—Calculated for $C_{23}H_{15}Cl_4N_2P$: C, 56.13 percent; H, 3.07 percent; Cl, 28.81 percent; P, 6.29 percent. Found: C, 55.99 percent; H, 3.03 percent; Cl, 28.70 percent; P, 5.8 percent.

This compound is useful as a pesticide, particularly against insects.

While there have been described various embodiments of the present invention, the methods described are not intended to be understood as limiting the scope of the invention. It is realized that changes therein are possible and it is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:
1. A composition of the formula

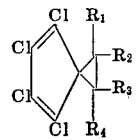

wherein $R_1$, $R_2$, $R_3$ and $R_4$ are selected from the group consisting of hydrogen alkyl from 1 to about 26 carbon atoms and when $R_2$ and $R_3$ are taken together alkylene from 3 to about 10 carbon atoms, phenyl and

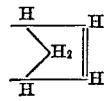

2. The composition of claim 1 wherein it is of the formula

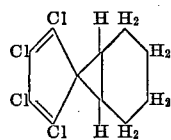

3. The composition of claim 1 wherein it is of the formula

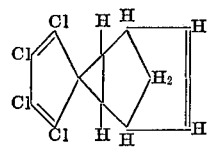

4. The composition of claim 1 wherein it is of the formula

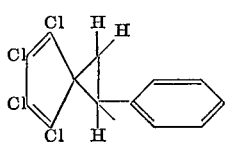

References Cited

Kirmse: "Carbene Chemistry," 68 and 79 (1964).
Schonberg et al.: "J. Am. Chem. Soc., vol. 75, p. 2267 (1953).
Levina: Chem. Abst., vol. 50, col. 3257a.

LEON ZITVER, *Primary Examiner.*

M. JACOB, *Assistant Examiner.*

U.S. Cl. X.R.
71—86, 126; 260—551, 650; 424—220, 352